United States Patent
Conwell

(10) Patent No.: US 8,070,960 B2
(45) Date of Patent: Dec. 6, 2011

(54) METHOD OF DEWATERING SOLIDS LADEN LIQUIDS UTILIZING A REUSABLE FILTER ELEMENT

(76) Inventor: Michael K. Conwell, New Castle, IN (US)

( * ) Notice: Subject to any disclaimer, the term of this patent is extended or adjusted under 35 U.S.C. 154(b) by 62 days.

(21) Appl. No.: 12/284,382

(22) Filed: Sep. 22, 2008

(65) Prior Publication Data

US 2009/0314715 A1 Dec. 24, 2009

Related U.S. Application Data

(60) Provisional application No. 60/997,714, filed on Oct. 4, 2007.

(51) Int. Cl.
*C02F 11/12* (2006.01)
*C02F 11/14* (2006.01)

(52) U.S. Cl. ........ 210/702; 210/767; 210/770; 210/250; 210/416.1; 210/484; 210/485

(58) Field of Classification Search .................... None
See application file for complete search history.

(56) References Cited

U.S. PATENT DOCUMENTS

| | | | | | |
|---|---|---|---|---|---|
| 3,419 | A | * | 1/1844 | Watson | 210/416.1 |
| 598,391 | A | * | 2/1898 | Pooler | 210/433.1 |
| 775,716 | A | * | 11/1904 | Williams | 210/485 |
| 824,566 | A | * | 6/1906 | Moss | 220/6 |
| 970,398 | A | * | 9/1910 | Sapp | 141/390 |
| 2,858,051 | A | * | 10/1958 | Cunningham | 222/103 |
| 2,865,511 | A | * | 12/1958 | Hopkins, Jr. | 210/416.1 |
| 3,191,810 | A | * | 6/1965 | Johnston | 222/183 |
| 3,295,689 | A | * | 1/1967 | Arvanitakis | 210/259 |
| 3,419,151 | A | * | 12/1968 | Wrotnowski et al. | 210/460 |
| 3,796,316 | A | * | 3/1974 | Matz | 210/332 |
| 3,825,119 | A | * | 7/1974 | Rost | 210/97 |
| 3,910,173 | A | * | 10/1975 | Zepponi | 99/277.1 |
| 3,931,015 | A | * | 1/1976 | Jenkins | 210/232 |
| 3,959,138 | A | * | 5/1976 | Nichols | 210/94 |
| 3,960,733 | A | * | 6/1976 | Van Dieren | 210/460 |
| 3,964,636 | A | * | 6/1976 | Rehrig | 220/495.06 |
| 3,984,320 | A | * | 10/1976 | Barefoot | 210/139 |
| 4,131,546 | A | * | 12/1978 | Olsson et al. | 210/771 |
| 4,189,386 | A | * | 2/1980 | Aman | 210/235 |
| 4,303,519 | A | * | 12/1981 | DelVecchio | 210/238 |
| 4,306,669 | A | * | 12/1981 | Grether | 222/105 |
| 4,307,764 | A | * | 12/1981 | Nattrass | 383/17 |
| 4,337,695 | A | * | 7/1982 | Clendaniel | 100/195 |
| 4,426,020 | A | * | 1/1984 | Presseau et al. | 222/108 |
| 4,518,507 | A | * | 5/1985 | Conner | 588/252 |
| 4,603,432 | A | * | 7/1986 | Marino | 383/2 |

(Continued)

*Primary Examiner* — Robert James Popovics
(74) *Attorney, Agent, or Firm* — Overhauser Law Offices, LLC

(57) ABSTRACT

A method of dewatering a solids laden waste stream, whereby the slurry is pumped into a vertical filter retaining structure and the liquid is allowed to flow out through the pores of the filtration element while retaining the solids within the structure. After the solids have dewatered, doors or gates located at the bottom of the structure are opened and the solids drop out the bottom by gravity. The structure is elevated to allow a transport vehicle to be placed under the doors prior to dropping out the solids. One embodiment utilizes an open bottom, closed top filter bag that is closed off by the doors or sliding gates located at the bottom of the structure. Another embodiment disclosed would use rigid filter plates to retain the solids and drop out the accumulated solids by opening sliding gates at the bottom of the structure. The filter bag or plates is accessible from the side to allow either manual or automatic pressure washing of the filtration elements or filter bag after each dewatering cycle.

2 Claims, 8 Drawing Sheets

U.S. PATENT DOCUMENTS

| | | | | |
|---|---|---|---|---|
| 4,604,203 A * | 8/1986 | Kyle | | 210/489 |
| 4,817,824 A * | 4/1989 | LaFleur et al. | | 222/105 |
| 4,839,047 A * | 6/1989 | Shishkin et al. | | 210/356 |
| 4,906,369 A * | 3/1990 | Bahr | | 210/297 |
| 4,929,353 A * | 5/1990 | Harris | | 210/237 |
| 4,946,478 A * | 8/1990 | Davis et al. | | 95/284 |
| 5,024,346 A * | 6/1991 | Roser | | 220/9.1 |
| 5,045,186 A * | 9/1991 | Takashima | | 210/90 |
| 5,110,005 A * | 5/1992 | Schilling | | 220/495.08 |
| 5,202,020 A * | 4/1993 | Desjoyaux et al. | | 210/446 |
| 5,336,408 A * | 8/1994 | Tsutumi | | 210/384 |
| 5,423,611 A * | 6/1995 | Sherrard | | 383/24 |
| 5,558,779 A * | 9/1996 | Eriksson | | 210/774 |
| 5,589,081 A * | 12/1996 | Harris | | 210/804 |
| 5,595,654 A * | 1/1997 | Caughman, Jr. | | 210/323.1 |
| 5,636,457 A * | 6/1997 | Eriksson | | 37/195 |
| 5,660,055 A * | 8/1997 | Eriksson | | 62/260 |
| 5,681,460 A * | 10/1997 | Caughman, Jr. | | 210/232 |
| 5,692,868 A * | 12/1997 | Riemersma | | 414/403 |
| 5,695,651 A * | 12/1997 | Froud | | 210/758 |
| 5,699,730 A * | 12/1997 | Ogier et al. | | 100/233 |
| 5,707,535 A * | 1/1998 | Harris | | 210/804 |
| 5,776,567 A * | 7/1998 | Schilling et al. | | 428/34.5 |
| 5,788,449 A * | 8/1998 | Riemersma | | 414/415 |
| 5,804,069 A * | 9/1998 | Eriksson | | 210/248 |
| 5,851,391 A * | 12/1998 | Ozawa | | 210/350 |
| 5,858,226 A * | 1/1999 | Caughman, Jr. | | 210/232 |
| 5,944,993 A * | 8/1999 | Derrick et al. | | 210/388 |
| 5,947,333 A * | 9/1999 | Hoffmann et al. | | 222/105 |
| 5,961,827 A * | 10/1999 | Bahr | | 210/387 |
| 5,975,642 A * | 11/1999 | Dibble et al. | | 298/17 R |
| 6,004,461 A * | 12/1999 | Harris | | 210/241 |
| 6,063,296 A * | 5/2000 | Ackerman et al. | | 210/767 |
| 6,076,702 A * | 6/2000 | Hoffmann et al. | | 222/1 |
| 6,110,388 A * | 8/2000 | Norais et al. | | 210/770 |
| 6,135,293 A * | 10/2000 | Herbst et al. | | 210/351 |
| 6,149,803 A * | 11/2000 | DiLoreto et al. | | 210/164 |
| 6,186,360 B1 * | 2/2001 | Becker et al. | | 222/1 |
| 6,258,268 B1 * | 7/2001 | Lake | | 210/238 |
| 6,281,001 B1 * | 8/2001 | McNelly | | 435/262 |
| 6,305,845 B1 * | 10/2001 | Navin | | 383/67 |
| 6,305,876 B1 * | 10/2001 | Yoshino et al. | | 405/17 |
| 6,401,983 B1 * | 6/2002 | McDonald et al. | | 222/181.2 |
| 6,685,843 B2 * | 2/2004 | Leaverton | | 210/805 |
| 6,797,164 B2 * | 9/2004 | Leaverton | | 210/167.12 |
| 6,869,539 B2 * | 3/2005 | Sheets | | 210/747 |
| 6,878,266 B2 * | 4/2005 | Leaverton | | 210/167.12 |
| 6,902,061 B1 * | 6/2005 | Elstone | | 206/600 |
| 6,911,145 B2 * | 6/2005 | Hutchinson et al. | | 210/258 |
| 6,968,946 B2 * | 11/2005 | Shuert | | 206/386 |
| 7,025,318 B2 * | 4/2006 | Hurst et al. | | 248/331 |
| 7,045,068 B2 * | 5/2006 | Hutchinson et al. | | 210/808 |
| 7,188,744 B2 * | 3/2007 | Hurst et al. | | 220/9.2 |
| 7,383,766 B2 * | 6/2008 | McIntosh et al. | | 100/92 |
| 7,410,576 B2 * | 8/2008 | Brouillard et al. | | 210/241 |
| 7,819,269 B2 * | 10/2010 | Perkins | | 220/1.6 |
| 2005/0167373 A1 * | 8/2005 | Pancaldi et al. | | 210/791 |
| 2006/0011561 A1 * | 1/2006 | Brouillard et al. | | 210/767 |
| 2006/0102565 A1 * | 5/2006 | Alford | | 210/770 |
| 2007/0034578 A1 * | 2/2007 | Brouillard et al. | | 210/767 |
| 2007/0215533 A1 * | 9/2007 | Tittgen | | 210/198.2 |
| 2008/0078726 A1 * | 4/2008 | Pancaldi et al. | | 210/770 |
| 2009/0314715 A1 * | 12/2009 | Conwell | | 210/650 |

* cited by examiner

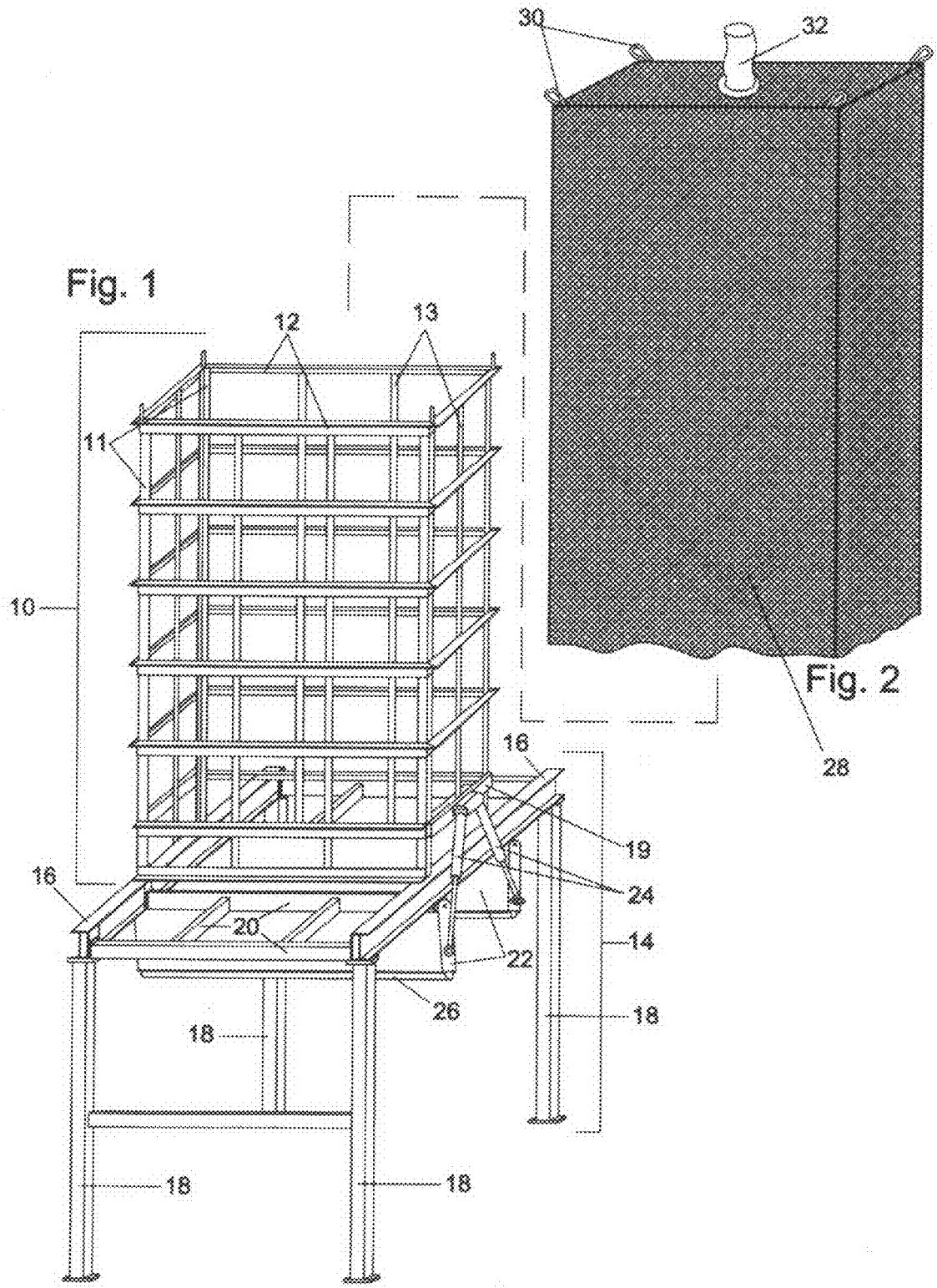

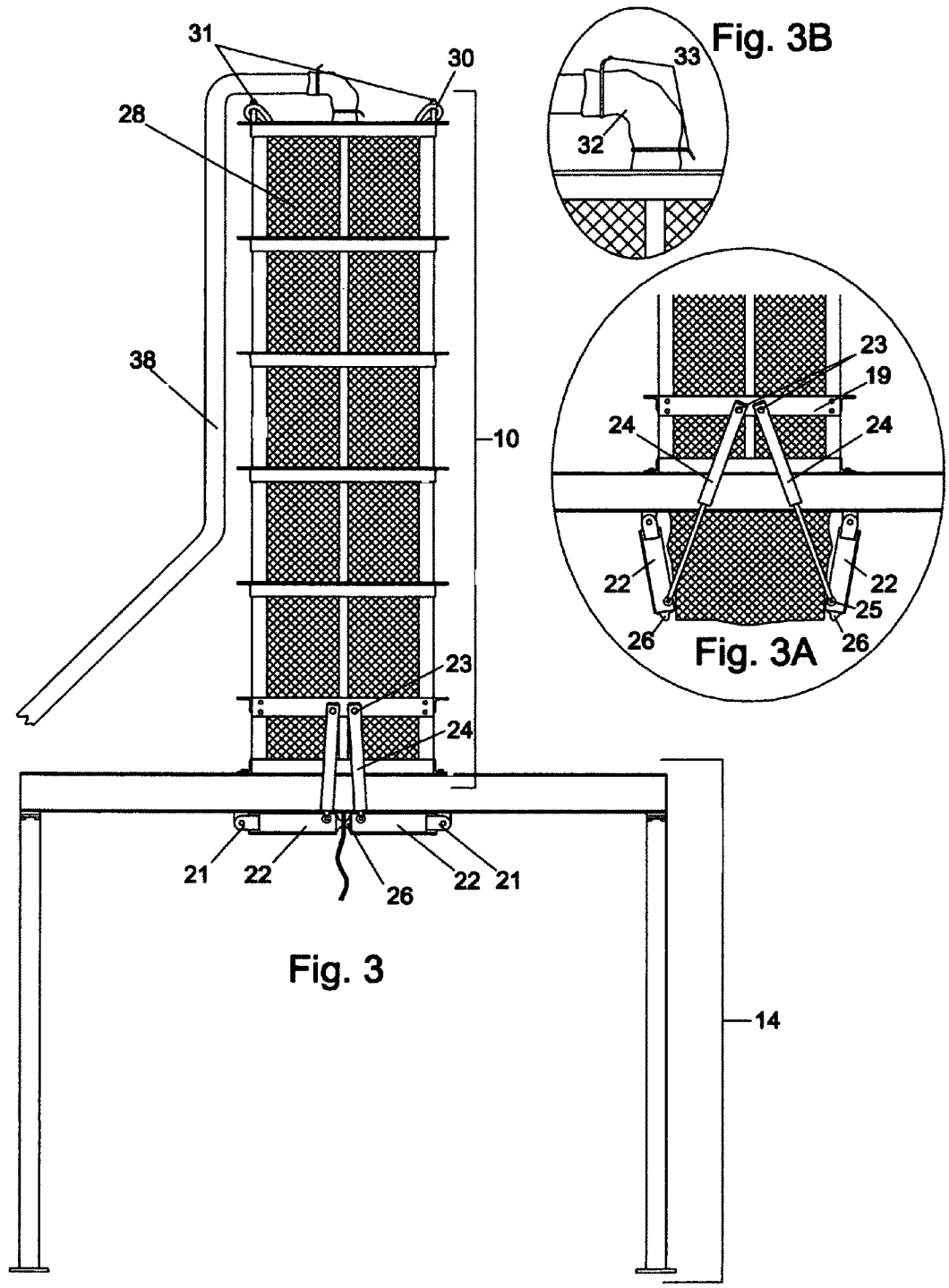

US 8,070,960 B2

METHOD OF DEWATERING SOLIDS LADEN LIQUIDS UTILIZING A REUSABLE FILTER ELEMENT

CROSS-REFERENCE TO RELATED APPLICATIONS

This application claims the benefit of provisional patent application Ser. No. 60/997,714 filed Oct. 4, 2007 by the present inventor.

FEDERALLY SPONSORED RESEARCH

Not Applicable

SEQUENCE LISTING OR PROGRAM

Not Applicable

BACKGROUND OF THE INVENTION

1. Field

This invention generally relates to the process of filtering the liquid from a solids laden slurry or waste material. More specifically, it is an improved method of separating the water from the solids and allowing the water to filter out leaving the solids inside the filter after which they can be extracted for disposal or reprocessing. The process is generally known as "dewatering" and is desirable in that it allows the solids to be reprocessed, transported or disposed of at a lower cost than a liquid.

2. Prior Art

There are many different types of "dewatering" apparatus in use today. Many of these are mechanical in nature and require a large amount of energy to operate and specialized skills to maintain. One example is disclosed in Heywoods "Apparatus For Treating Sewage" U.S. Pat. No. 392,607. Another is disclosed in U.S. Pat. No. 3,970,552 "Method and Means For Separation Of Liquids From A Mixture Of Solids And Liquids" by Bongert.

Many other examples can be found of mechanical dewatering equipment that is in use today for high volume dewatering of liquid slurries. Many of these devices work very well but all have the disadvantage of high operating and maintenance costs. There are also examples that can found of devices that address the disadvantage of the mechanical dewatering processes. One example of this is U.S. Pat. No. 4,116,838 "Sludge Filter" by Lazzarotto. This device is an enclosed sludge filter utilizing an open top tank and filter panels to filter out the solids.

Another example of a similar device is U.S. Pat. No. 4,133,769 "Liquid Filter Having Self-Retaining Filter Bag" by Morgan, Jr. This device is a filter bag suspended inside a shell. The sludge is pumped into the bag and the liquid allowed to flow through the bag and discharged out the bottom of the shell. While this device may work well for some types of slurry it has a major disadvantage in that the dewatered material must be lifted out of the device to dispose or reprocess. This limits the amount of material that can be effectively dewatered due to the weight of the dewatered material.

Another example of prior art would be U.S. Pat. No. 5,287,985 "Container For Dewatering or Packaging and Transportation" by Hatayama. This device again has the limitation in that the volume of dewatered material would have to be limited to the weight limitations of the device. Most dewatering processes require large volume and weight capabilities.

There are examples of prior art that utilize static filters or plates fixed inside of various types of containers. In general these devices are open top containers where the sludge is pumped into the container or box and the liquid allowed to filter out and out of the container. When dewatered the material is dumped out and the filters cleaned and the process repeated. Examples of this type of prior art would be U.S. Pat. No. 4,929,353 "Portable Liquid-Solid Separator For Bulk Sludge by Harris, U.S. Pat. No. 5,156,749 "Dewatering System For Sludge Removal" by Williams, U.S. Pat. No. 5,589,081 "Divided Phase Separator For Liquid/Solid Seperation In Sludge" by Harris, U.S. Pat. No. 5,595,654 "Sludge Filtration System And Method" by Caughman, Jr., and U.S. Pat. No. 4,871,454 "Portable Dumpster Slurry Separating System" by Lott. All of these systems utilize some type of filter fixed in the bottom and or sides of the open top container. The solids can be emptied out with a few variations of tilting up and dumping out.

Large Geotextile dewatering bags have been used successfully in dewatering many different types of slurries. These large filter bags are sewn in cylindrical shapes in sizes from 6 foot circumference and 12 feet long up to 90 foot circumference with lengths of 300 feet. The slurry is treated with a flocculent and pumped into the bags where the solids are captured and the liquid bleeds out through the filtration fabric. After the contents have been allowed to dry for various time periods of from a few days to months or even years the bag is cut open and the contents removed. One example of this type of prior art is U.S. Pat. No. 6,186,701 B1 "Elongate Flexible Container" by Kempers.

Another example would be U.S. Pat. No. 7,112,283 B2 "Method And System For Processing Waste by Stephens. This type of slurry dewatering has the advantage of low initial cost and minimal operating and maintenance expenses. The disadvantages of this process include the handling expense of the consolidated solids and also the fact that these bags are laid out on the ground and are subject to weather related problems and drainage issues. In addition the fact that the bag is positioned on the ground tends to blind off the bottom of the bag which is where the liquid is most likely to drain out. That fact causes the liquid to pool up inside the bag and increases the drying time required to accomplish the dewatering phase.

The device presented in this patent application addresses the many of the disadvantages of the current processes. This device utilizes a vertical skeletal frame work into which filter panels or a filter bag can be installed. At the bottom of the framework a set of doors or gates that can be opened or closed are utilized for dumping the collected and dewatered solids. The filter panels or bag are easily accessible for cleaning after each use. The vertical orientation of the filter retention frame work utilizes the natural forces of gravity to induce maximum drainage of the liquid from the bag. There are few moving parts to this device so maintenance and operational costs are minimal. The advantages of this device over current systems is readily apparent.

SUMMARY

In accordance with one embodiment a steel skeletal frame work is provided. The framework extends vertically and would be rectangular or square. One embodiment might have dimensions of 3 feet by 6 feet by 12 feet high. Any number of different sizes and or shapes would be possible. The framework would be designed to contain a large filter bag that would be suspended inside the framework with straps at the top of the bag. Hooks or pins would be fixed to the top of the framework at each corner to suspend the bag from straps located in each corner of the top.

The filter bag is a closed top bag with a suitable fill port located at the top of the bag. The bottom of the bag would be left open and of sufficient length to hang below the framework by a suitable length. This framework would sit on top of a support system constructed of iron or concrete that would allow a transport vehicle to be positioned under the frame to allow the contents of the bag to gravity feed out of the bag and down into the hopper of the vehicle. At the bottom of the framework a set of doors or gates would be installed that will close around the open end of the filter bag. These doors would include an elastic seal that would compress around the bag effectively closing off the bottom of the bag to prevent leakage of solids out the bottom of the bag.

Slurry would be pumped into the bag through a pipe and into a fill port in the bag. I contemplate that this fill port will be in the top of the bag but it could be placed in the side of the bag. As the slurry is pumped into the bag a chemical commonly referred to as a flocculent or coagulant may be added depending on the type of sludge that is to be dewatered. The chemical will cause the solids to separate from the water and form agglomerations. The clear water will filter through the side walls of the bag and flow down the sides and out the bottom of the bag. The water will then fall down into the area below the framework where it can be collected and sent to a floor drain. Sheet metal guards can be fabricated to catch all of the water as it drains out of the bag and divert it to pipes if so desired.

As the slurry builds up in the bag a hydrostatic head is developed that will force water out of the bag more rapidly. Since the sidewalls of the bag are open there is little resistance formed to keep the water from flowing freely out of the bag and draining down the sidewalls. The bag can be pumped to its full capacity and then allowed to dewater. As the water releases from the bag the level will drop down sufficiently to allow a second pumping in many cases. After that the bag will be allowed to sit for one or two days and then the contents removed.

At the bottom of the framework is a set of doors or gates that can be opened or closed. I contemplate these doors to be operated with a set of hydraulic cylinders but they could also be opened and shut with mechanical linkage or screw drive. When closed the gate closes on the open end of the bag sealing it for the fill process. When the bag is deemed full of solids a transportation device can be pulled underneath these doors. The doors will be opened and the material in the bag will drop down into the bed or hopper. After removal of the contents of the bag the bag can be pressure washed from the outside, leaving the doors open to allow any material that remains on the inside of the bag to flush out of the bag. One embodiment of this apparatus would have an automatic spray wash system mounted on the framework. Spray nozzles would be turned on and the bag flushed automatically. After the wash cycle the doors or gates would be closed and the process repeated.

In a second embodiment of this method the filtration element would be fixed rigid panels installed inside the skeletal frame work. These panels could be manufactured from stainless steel, plastic or aluminum or other suitable material and would be permeable to allow the passage of free liquid while retaining the solids inside the filter. At the bottom of the frame work a set of doors would be installed that could be opened or closed. A seal would be installed between the bottom of the filter plates and the door to prevent leakage of solids. In this embodiment a set of rigid filter panels would also be installed across the top to form a closed container. The top would include a flanged port which would be connected to the fill pipe.

DRAWINGS

Figures

FIG. 1 is a isometric view of one embodiment of the skeletal framework. This view shows the filter retainer and the supporting structure. You can also see the ends of the doors along with the hydraulic cylinders that open and close these doors.

FIG. 2 is an isometric view of one embodiment of a hanging bag. This view shows the closed top of the bag and the loops that are used to hang the bag inside the framework. The bag is of sufficient length that when inserted and hung in the frame work the open bottom of the bag will extend down and through the hydraulic doors. The fill port of the bag is shown on the top of the bag.

FIG. 3 is a Front Elevation view of one embodiment showing the filter retainer with bag inside, the door cylinders are also shown with the doors closed on the open end of the bag. At the top the bag straps are shown along with the pins that hang the bag inside the frame.

FIG. 3A is a view of the hydraulic doors in the open position. The open end of the bag is shown hanging down and through the open doors.

FIG. 3B is a view of one embodiment of the fill port of the bag attached to the fill tube. In this embodiment the soft fill port is shown wrapped around the fill tube and secured with cable ties.

Figure 4:
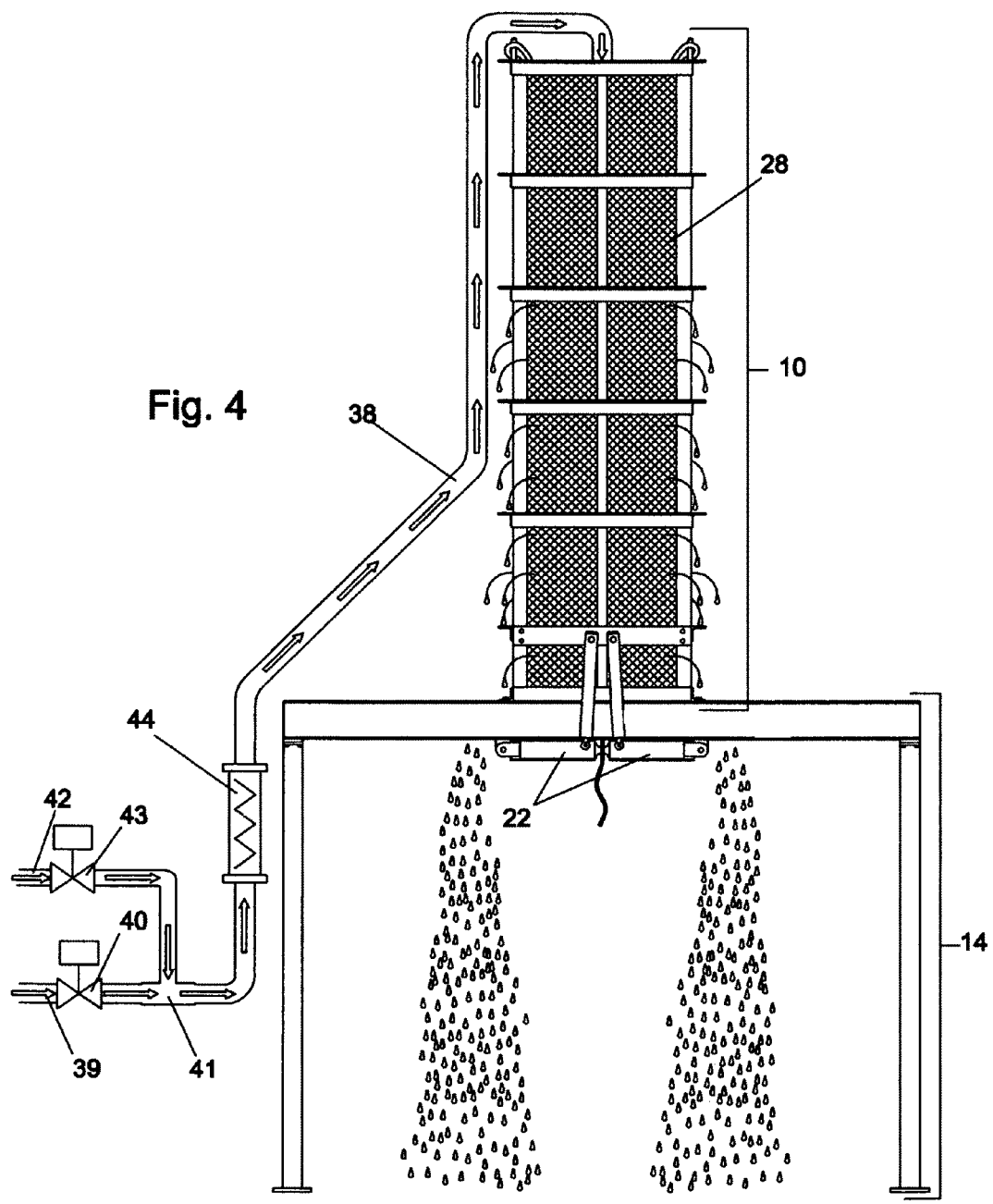

FIG. 4 is a Front Elevation view showing the filter retainer and under carriage in the dewatering phase. Slurry is being pumped into the bag and the free liquid is flowing thru the filter. The liquid that flows out of the filter retainer is flowing down the sides and dropping down under the framework. This view also shows the fill pipe with the flocculent injection tee, the slurry line, slurry line shut off valve, the flocculent line, flocculent shut off valve and the flocculent/slurry mixing chamber.

Figures 5, 6:
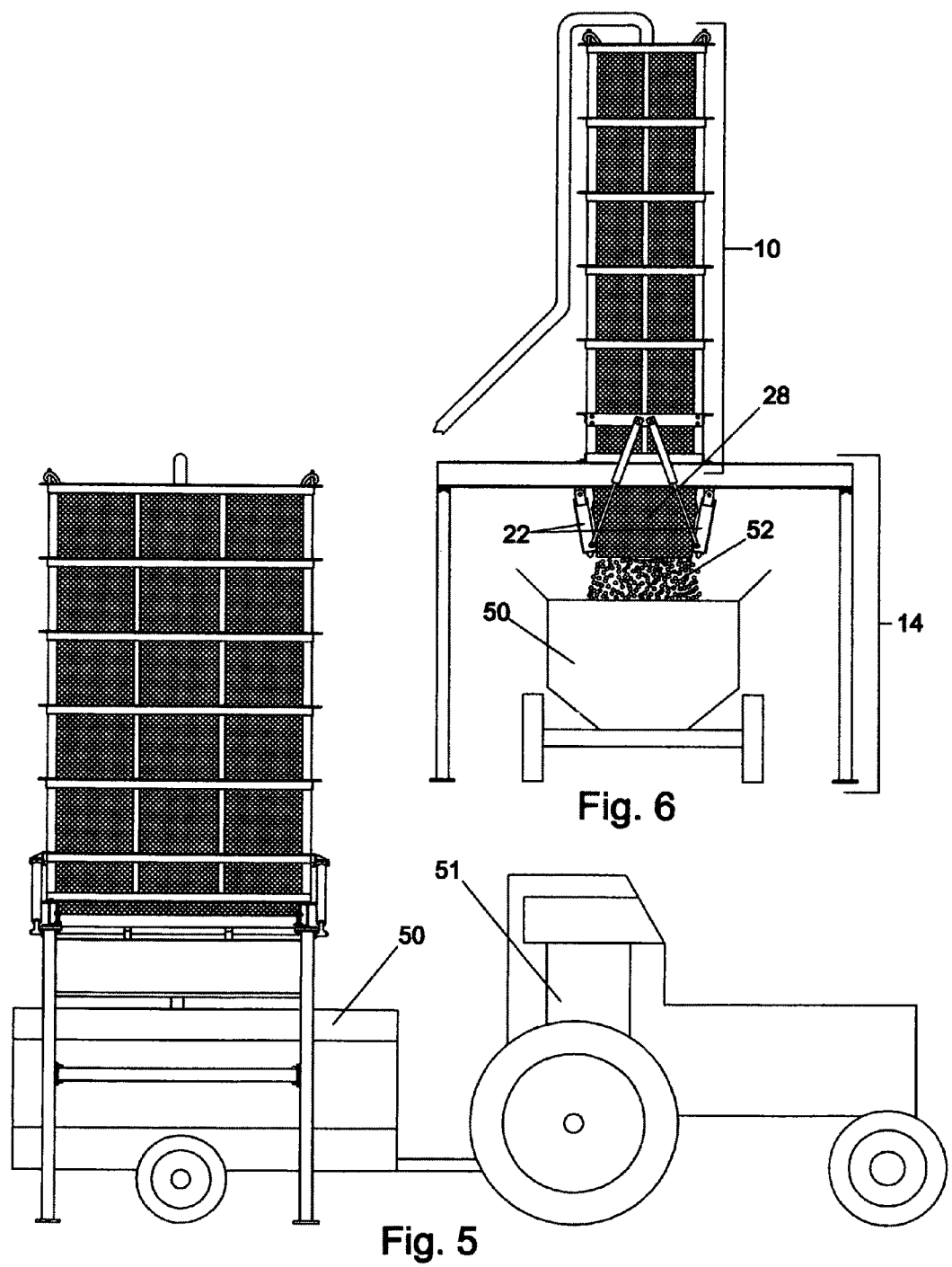

FIG. 5 is a Side Elevation view showing the transporter positioned under the under carriage in preparation for dumping the contents.

FIG. 6 is a Front Elevation view showing the doors opened and the contents of the filter retainer dropping out into the transporter.

Figure 7:
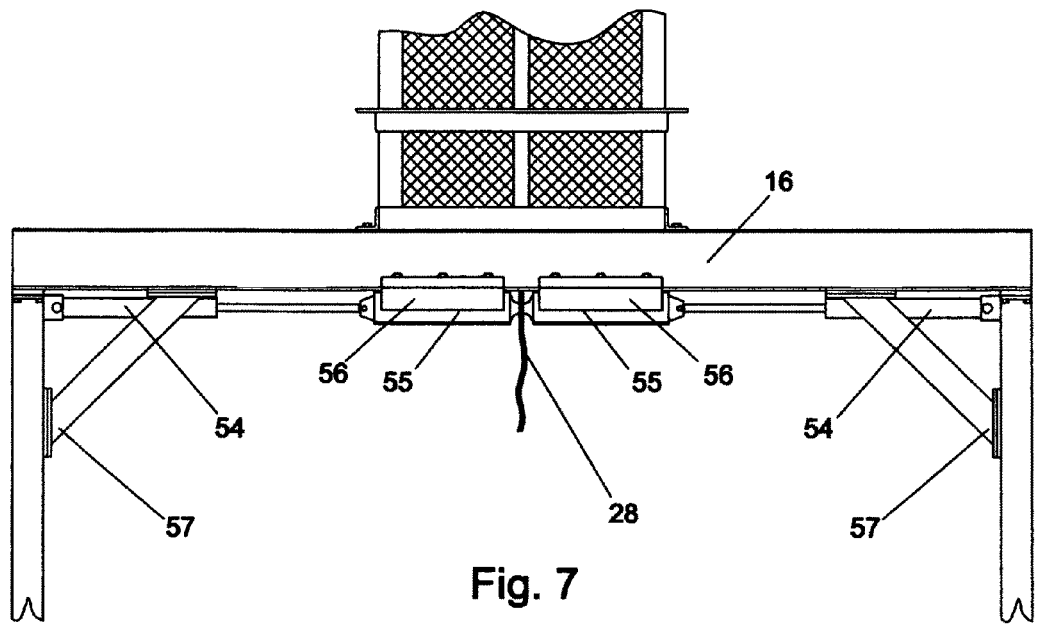

FIG. 7 shows another embodiment of the door arrangement. This embodiment has the doors riding on h beam rail and closing straight in on the bottom of the bag instead of swinging shut on hinges. This view shows the doors closed on the open end of the bag.

Figure 8:
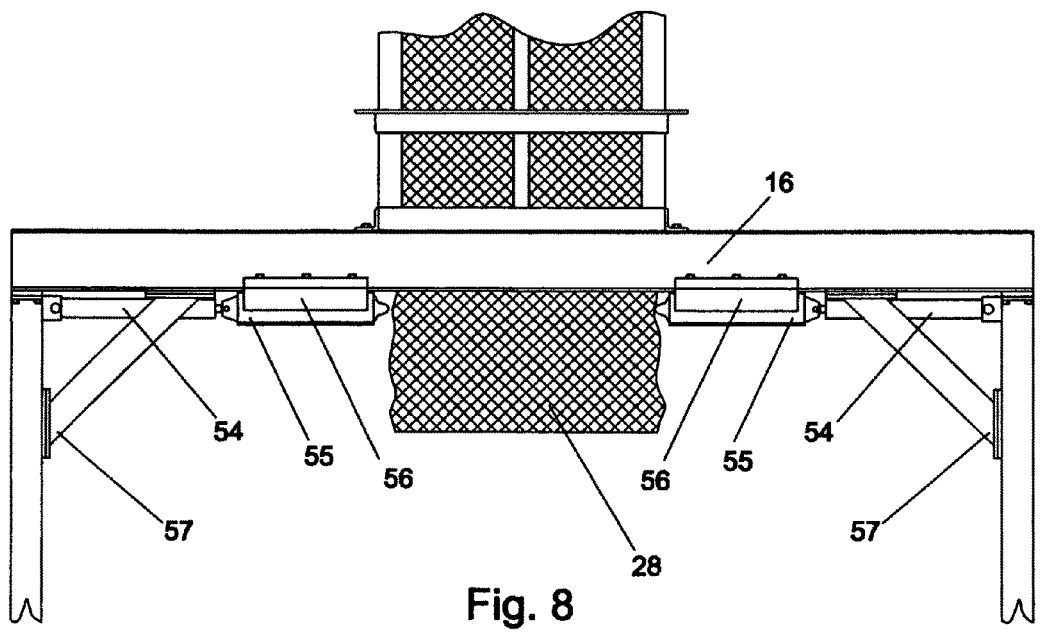

FIG. 8 shows these doors in the open position with the open end of the bag hanging through the doors.

Figure 9:
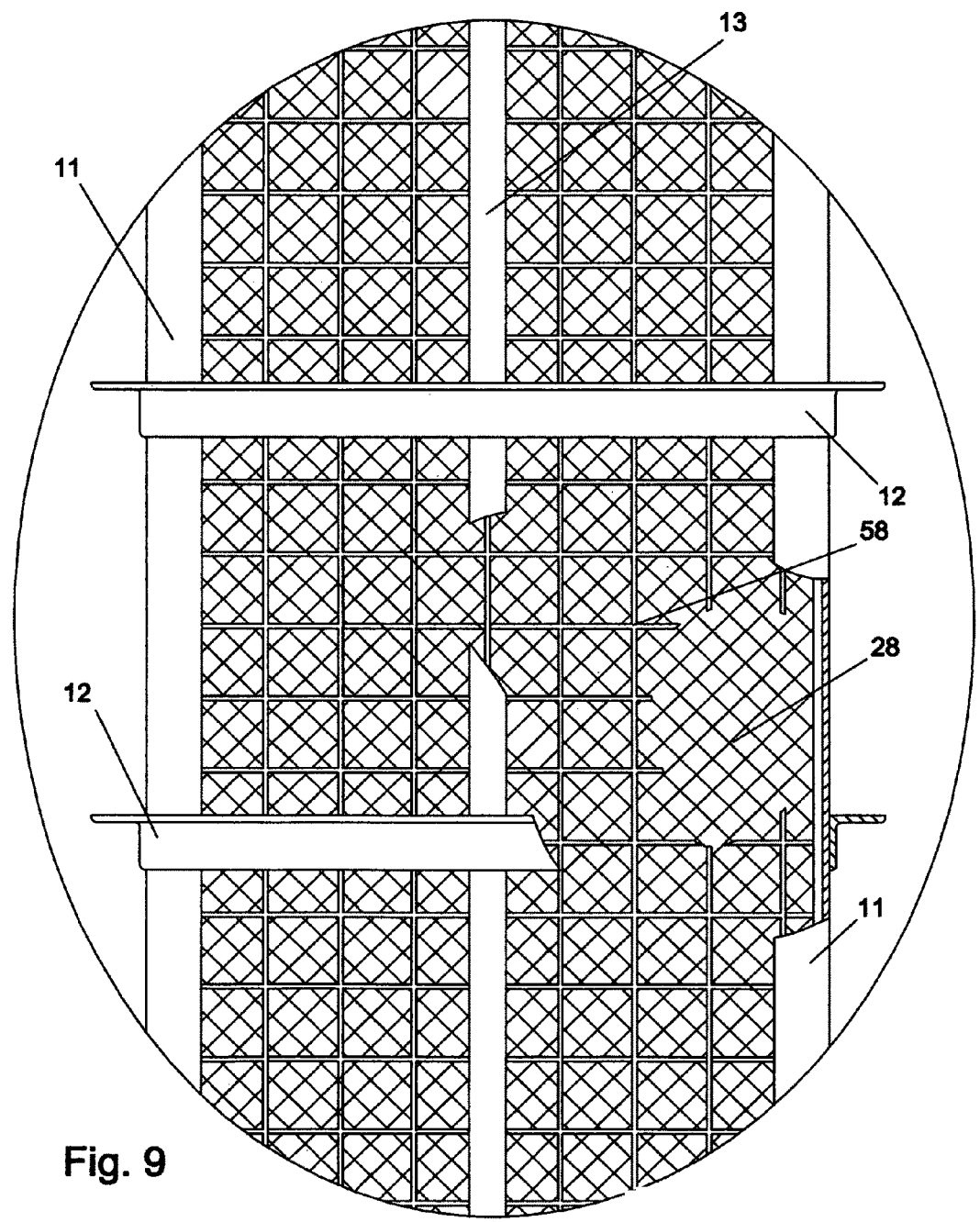

FIG. 9 shows one embodiment of a support grid used to help prevent the bag from protruding through the steel cross pieces of the bag frame during the fill cycle. This is a cut away view showing a stainless steel mesh installed between the bag frame and the bag.

Figures 10, 10A, 10B, 10C:
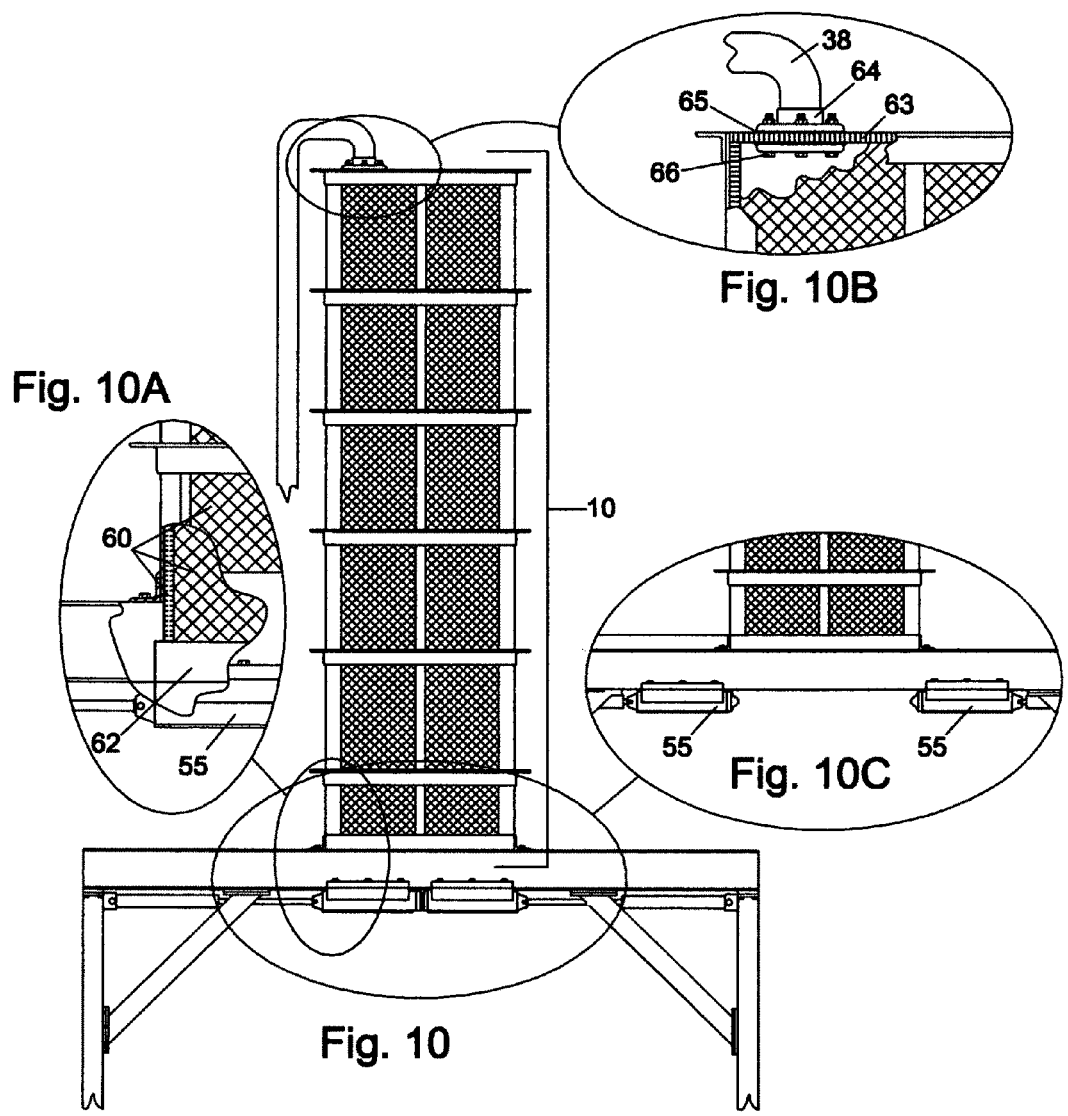

FIG. 10 shows another embodiment of the filter retaining frame work in which rigid filter panels are used as a filtering medium. This embodiment has the fill port installed in the top panel. Installed below the frame work is a set of sliding doors that seal off the bottom.

FIG. 10A shows a cut away view of the bottom area of the filter retaining frame work. This view shows the filter panels installed and the seal between the bottom of the filter panels and the sliding door.

FIG. 10B shows the fill port in the top filter panel with the flange adapter, flange seal and flange bolts.

FIG. 10C shows the bottom of the filter retaining frame work and the two sliding doors in the open position.

REFERENCE NUMERALS

| | |
|---|---|
| 10 | filter retainer |
| 11 | vertical upright |
| 12 | frame |
| 13 | vertical bars |
| 14 | under carriage |
| 16 | h beam |
| 18 | tubular leg |
| 19 | cross member |
| 20 | frame work |
| 21 | Hinge block |
| 22 | door |
| 23 | frame pivot pin |
| 24 | hydraulic cylinder |
| 25 | door pivot pin |
| 26 | elastomeric seal |
| 28 | filter bag |
| 30 | bag strap |
| 31 | bag retaining pin |
| 32 | port |
| 33 | cable tie |
| 34 | port fabric |
| 35 | stainless steel bolt |
| 36 | clamp ring |
| 38 | fill pipe |
| 39 | slurry line |
| 40 | slurry valve |
| 41 | injection tee |
| 42 | flocculent line |
| 43 | flocculent valve |
| 44 | static mixer |
| 50 | spreader |
| 51 | tractor |
| 52 | dewatered solids |
| 54 | horizontal cylinder |
| 55 | sliding gate |
| 56 | guide rail |
| 57 | angle brace |
| 58 | wire mesh |
| 60 | rigid filter plates |
| 62 | door seal |
| 63 | top filter panel |
| 64 | flange connector |
| 65 | flange seal |
| 66 | flange bolt |

DETAILED DESCRIPTION

First Embodiment

One embodiment of the bag retainer 10 and under carriage 14 is shown in FIG. 1. The frame work in this embodiment is constructed with (4) four vertical angle iron uprights 11. The uprights are connected with rectangular frames 12 that run horizontal around the structure. I contemplate these frames 12 to be heavy angle iron but they could be structural tubing or many other types of materials. In this embodiment there are (5) five of these frames 12. These frames 12 are spaced vertically down the structure to provide sufficient strength to retain the pressure created by the fluid column as the bag is filled. This embodiment has (6) six vertical bars 13 running from the top of the frame work to the bottom. These bars are in place to help prevent the bag from protruding out between the angle iron frames 12 as the bag is filling with fluid. Additional support bars can be used as needed to prevent this from occurring. The filter retainer 10 is fixed to the top of the undercarriage 14 to provide a space under the bag for a transport vehicle to be positioned under the bag. Many different embodiments of this undercarriage 14 are possible, including fabricated steel or concrete systems. This embodiment of the undercarriage 14 is constructed with H beam 16 cross supports that rest upon tubular legs 18. A tubular steel frame work 20 is fixed to the under carriage 14 to provide rigidity and also support the hydraulic actuated doors 22. These doors 22 are connected to the framework 20 with heavy hinge blocks 21 and are opened and shut with (4) four hydraulic cylinders 24. These cylinders 24 are fixed to one end of the door and a cross member 19 bolted to the filter retainer 10. On the face of each of these doors is a elastomeric seal 26. This purpose of this seal can be seen in FIG. 3. This embodiment utilizes a geotextile filter bag 28 to dewater the slurry as shown in FIG. 2. This filter bag 28 is manufactured from a geotextile filtration fabric and fabricated in a rectangular shape. The corners of the bag can be sewn, overlapped and glued or heat sealed to produce a leak free seam at the corners and all around the closed top. At the top of the bag (4) four bag straps 30 are attached which will provide a method of suspending the bag. At the top of the bag is a port 32 to allow the slurry to be pumped in. The bottom of the bag is left open while the top is closed.

Figure 2B:
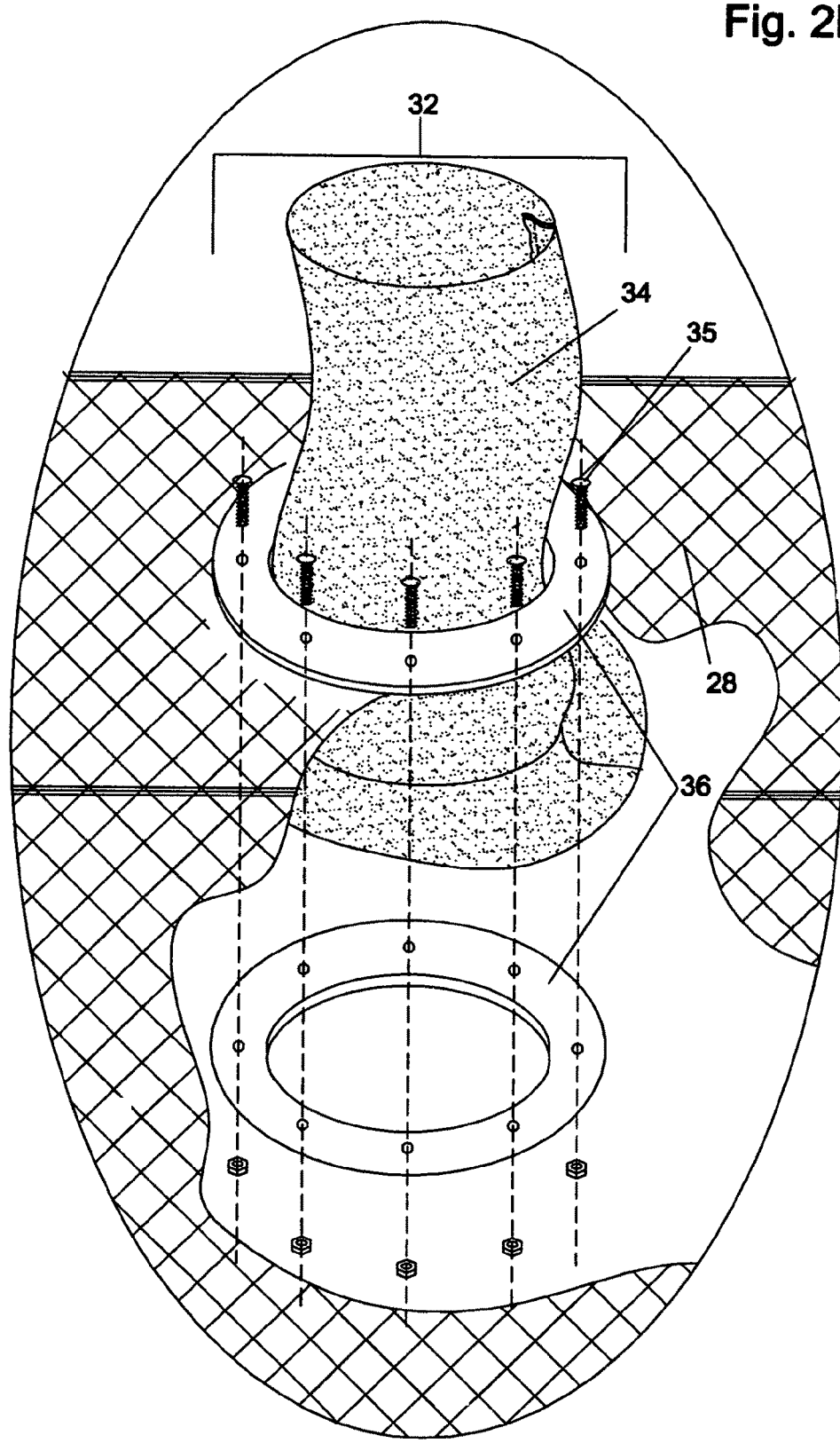
FIG. 2B is an exploded view of the fill port and the clamp rings that attach the port to the bag.

FIG. 2B shows one embodiment of the bag fill port 32. This port 32 is a non woven geotextile port fabric 34 sewn into a cylinder and secured to the bag with two clamp rings 36. Many other types of fabric could be used to produce this port. The port fabric 34 and the bag fabric 35 are trapped between the clamp rings 36 and secured with stainless steel bolts 38 providing a secure connection.

FIG. 3 is a front elevation view of the filter retainer 10 and the under carriage 14. In this view it can be seen that the filter bag 28 has been dropped down into the filter retainer 10 and the bag straps 30 looped over (4) bag retaining pin 31 welded to the top. These bag straps 30 will hold the bag up inside the filter retainer 10 when the doors 22 are in the open position. The bag fill pipe 38 is shown running up the side of the filter retainer 10 and down into the filter bag 28. This fill pipe 38 can be steel or plastic pipe or a fill hose if desired. The slurry is pumped up and into the filter bag 28 through this pipe. The fabric port 32 is slipped over and wrapped around the fill pipe 38 and cinched up with cable ties 33 as shown in FIG. 3B. Directly under the filter retainer 10 are (2) two fabricated doors 22 that are hinged to open downward as shown in FIG. 3A. The doors 22 are opened and closed by hydraulic cylinders 24 fixed to the ends of the door on one end and a cross member 19 bolted to the frame work on the other. There are (2) cylinders 24 on each door, one on each end. These cylinders are fixed to the frame work with a pivot pin 23 and fixed to the doors with pins 25 to allow the doors to fully open. These doors close on the open end of the filter bag as it hangs down through the doors. On the face of each door a heavy duty rubber or elastomeric seal 26 is installed so that they meet in the center effectively closing off the bottom of the filter bag 28 for filling.

A side elevation view of the bag containment structure and support structure is shown if FIG. 4. This view is shown with the doors 22 closed. During the fill operation these doors 22 are in the closed position effectively sealing off the bottom of the bag. Latching mechanisms' (not shown) could be added to the doors 22 to insure that they will not open during the filling operation. In this embodiment an injection tee 41 has been installed ahead of the fill pipe 38. The incoming slurry line 39 is equipped with a suitable slurry shut off valve 40. A flocculent solution is pumped through a flocculent line 42 and flocculent shut off valve 43 and injected into the incoming slurry. Between the injection tee 41 and the fill tube 38 is a static mixer 44. In the dewatering phase free liquid will cascade down and can be drained off as needed by drains located under the structure.

Gutters (not shown) can be fabricated that will capture this liquid and divert it into pipes that lead to a suitable drain. Installing gutters and capturing the free liquid will reduce or eliminate the amount of water that drops down under the structure as the bag is being filled.

Description Alternate Embodiment FIG. 7 and FIG. 8

An alternate embodiment of the door closing mechanism is shown in FIG. 7 and FIG. 8. In this embodiment the sliding gates 55 are attached to the support by guide rails 56 running on the H beam 16. These sliding gates 55 open and close horizontally instead of swinging on hinges as in the first embodiment. The horizontal cylinders 54 are mounted horizontal to the axis of the frame. FIG. 7 shows the sliding gates 55 closed on the end of the bag 28. In FIG. 8 the sliding gates 55 are pulled back by the horizontal cylinders 54 and the open end of the bag 28 is free to gravity drop the dewatered solids. In this embodiment there are shown some angle braces 57 that provide additional support.

Description Alternate Embodiment FIG. 9

In some cases the material that the filter bag is manufactured from could be light weight and will require some type of restraining device to retain the bag. FIG. 9 shows one embodiment of this restraining device. A stainless steel wire mesh 58 has been installed between the filter bag 28 and the frame 12. This mesh can be secured to the vertical uprights 11, the rectangular iron frames 12, and/or the vertical bars 13. This wire mesh 58 will provide additional support to prevent the bag from protruding out between the lateral and vertical supports of the frame work as the filter bag 28 fills and the internal pressure increases. Many other types of material can be used to reinforce these areas such as grating, expanded metal, or plastic mesh.

Description Alternate Embodiment FIG. 10, FIG. 10A, FIG. 10B and FIG. 10C

In this embodiment the filtration element consists of rigid filter plates 60 fixed to the inside of the filter retainer 10 as shown in FIG. 10A. These plates would be installed mechanically to the inside and would form a container with (4) sides. At the bottom a seal 62 would be installed that would prevent leakage of solids between the bottom of the rigid filter plates 60 and the sliding gate 55. I contemplate this seal to be an inflatable door seal that is commonly used to seal around sliding doors but it could be one of many different types of seals that would work equally well including but not limited to lip seal, O-ring, or some type of spring loaded mechanical seal. In this embodiment I would contemplate the top would be closed with a top filter panel 63 as shown in FIG. 10B but in some cases it might be desirable to leave the top open. In the embodiment with a closed top, a suitable connection between the top filter panel 63 and the fill tube 38 would be required. One embodiment of this connection is shown in FIG. 10B wherein a mechanical flange connector 64 with flange seal 65 is installed through the top filter panel 63 and secured with flange bolts 66.

Operation First Embodiment FIG. 1, FIG. 3B, FIG. 4, FIG. 5 and FIG. 6

In operation this device is capable of dewatering a wide variety of slurries. One example would be dewatering swine, dairy or beef cattle waste. In confined space hog, dairy or beef production the manure and waste is many times collected directly under the barn area. The floors of the barn are slotted allowing the waste material to accumulate under the barn. This material is diluted by wash water and other liquids and finally is removed by pumping or draining. The waste material is either sent to a lagoon storage area or in many cases used as a fertilizer. The accumulated slurry can be pumped into a tanker truck or wagon and taken to farm fields and applied as liquid manure. Application of this material as a liquid has a number of disadvantages including environmental damage due to runoff of the liquid into adjacent waterways or ditches. Odor from the liquid manure cause issues with adjacent land owners. Dewatering the waste reduces these liabilities and also reduces the number of trips across the farm fields, reducing soil compaction and lowering fuel costs.

In food processing slurries are created that contain large amounts of solids that must be removed before the water can be either reused in the process or sent to a waste water treatment facility. Many times these slurries contain solids that are very easy to separate and dewater such as potato peelings or grit from the washing processes.

In the coal mining process fine particles of coal are lost in the washing process and must be settled out in large holding ponds. This material can be captured with this dewatering process and the coal reclaimed for sale.

In municipal waste water treatment plants the solids are accumulated in digesters. Eventually this slurry must be removed from the digester and dewatered. The reader can see that this process is a very low cost and efficient process to dewater and dispose of these solids. The material dewatered and collected can be mixed with lime, fly ash or other material and composted for disposal or use as a fertilizer.

In the sand and gravel industry the washing process many times produces a slurry stream that contains large amounts of small aggregate material that could be reclaimed by this process.

Many other industries develop slurry streams that must be dewatered with some type of process. This process can be set up quickly and at a significantly lower cost than many of the processes currently in use today.

The filter retainer 10 and under carriage 14 shown in FIG. 1 would be installed at the production operation near the tank, barn or lagoon where the liquid slurry has accumulated. A suitable pad or foundation would be constructed upon which the device would be placed. With the doors 22 in the open position a filter bag 28 would be dropped down inside the filter retainer 10. The bag straps 30 would be looped over the bag retaining pins 31 to suspend the filter bag 28. The fill port 32 of the filter bag 28 would be slipped over the fill pipe 38 and tied off with the cable ties 33. The hydraulic cylinders 24 would then be extended closing the doors 22 on the open end of the bag. When the doors 22 come together the elastomeric seals 26 will compress against the sides of the bag effectively sealing off the bottom of the filter bag 28.

Prior to pumping any slurry into the bag the material to be dewatered should be evaluated to determine if a flocculent is needed to prevent blinding the pores of the filter bag 28. If it has been determined that a flocculent or coagulant is required the proper mixing equipment and injection pumping equipment would be installed at a location near the dewatering area. This flocculent or coagulant solution would be pumped over to the unit into the flocculent line 42 shown in FIG. 4. In some cases more than one chemical may be required to increase the efficiency of the process. For example it is known that by adding a coagulant to the slurry prior to injecting a flocculent one may increase the dewatering rate of the process. In this case you would have two separate chemical lines and injection points to mix the additional chemical with the slurry.

It is desirable to circulate or agitate the slurry until the solids and liquid are mixed to a uniform state. That is to say that solids in the slurry would be evenly distributed so that the percent solids flowing though the line would be relatively constant. The dosage or rate of flow of the flocculent solution is based on volume and percent solids of the slurry to be dewatered. It can be seen that controlling the flow rate of the slurry to a fixed rate and maintaining the
percent solids of the slurry within a narrow range will improve the process efficiency.

To begin the operation the operator will turn on the pump from the slurry holding area to the unit and simultaneously turn on the flocculent or coagulant delivery pump. The slurry shut off valve 40 and the flocculent shutoff valve 43 as shown in FIG. 4 will be turned on and the slurry and flocculent will flow up and through the static mixer 44. The flocculent will cause the solids in the slurry to agglomerate and separate from the free liquid. These agglomerations of solids are large enough to be held back by the filter fabric but not small enough to blind off the pores of the fabric. As the material flows into the filter bag 28 the free liquid will flow through the bag and drop down. This liquid can either be captured by drain pans or gutters (not shown) or allowed to simply fall down underneath the undercarriage where it can be drained off and sent back to the barn or lagoon.

The rate of drainage out of the bag will be somewhat less than the rate of flow into the filter bag 28. For example if the slurry consists of 1% solids by volume and the flow rate into the filter bag 28 is (100) one hundred gallons per minute you have (99) ninety nine gallons of free liquid going in. The free liquid flowing through the filter bag 28 might only be (75) seventy five gallons per minute. It is obvious to the reader that the filter bag 28 will begin to fill up with both solids and free liquid. As the material builds up inside the filter bag 28 a column of liquid/solid material begins to form. This column is restrained by the filter retainer 10 and filter bag 28. The column then develops pressure (commonly referred to as head pressure) that assists in forcing more of the free liquid out and though the pores of the filter bag 28.

Eventually the column of material in the bag will reach the top of the filter bag 28. It would be at this point that the slurry shut off valve 40 and the flocculent shut off valve 43 would be closed and the pumps shut down. Then the filter bag 28 is allowed to complete the dewatering process over some predetermined time period. This period may be a matter of a few hours to a few days depending on the type of material that is to be dewatered. After a suitable period most of the free water will drain through the pores of the filter bag 28 and drop out. At this point it may be possible to turn on the slurry and chemical pumps and repeat the filling process. In many cases multiple pumping/dewatering cycles will be completed before the filter bag 28 will have reached its capacity of retained solids. In some cases it may be advantageous to allow the slurry to continue flowing into the filter bag 28 after the slurry column has reached the top of the filter bag 28. By continuing to run the pumps you will develop pressure inside the filter bag 28 that will assist in forcing out the free water.

When it has been determined that the filter bag 28 has reached it capacity of retained solids, some type of disposal process of the material will be required. FIG. 5 shows one embodiment in which a farm tractor 51 and spreader 50 will be pulled under the unit. FIG. 6 shows the doors 22, opened up and the dewatered solids 52 dropping by gravity into the spreader 50. The material is then taken directly to the field and land applied as a solid fertilizer. The advantage of, applying the material as a solid rather than a liquid is obvious to the reader. Other embodiments of disposal are possible including but not limited to; Utilizing a standard land fill roll off to collect the solids and transporting the material to a storage area. Installing a hopper below the under carriage 14 and utilizing an auger or conveyor to move the material to a storage area or secondary processing area. Dropping the material below the under carriage 14 and removing it with a loader or pushing it out with a blade.

After the material has been gravity dropped from the filter bag 28 it has been found that pressure washing the bag will improve the efficiency of subsequent fill cycles. This wash process is easily accomplished with a standard pressure washing pump and wand. Any number of different styles and configurations of pressure washing devices can be installed and they are readily available. After completion of the wash process the doors 22 of the unit are closed and the process repeated.

There are many alternate embodiments and modifications which I intend to be included within the scope of this patent application.

CONCLUSION, RAMIFICATIONS, AND SCOPE

Accordingly the reader will see that, according to the first embodiment of the invention the method described can be used to effectively dewater a wide variety of solids laden slurries. The method is easily employed and can be produced at a lower cost than many of the present processes. While the above description contains many specificities, these should not be construed as limitations on the scope of any embodiment, but as exemplifications of the presently preferred embodiments thereof. Many other ramifications and variations are possible within the teachings of the various embodiments as shown in the alternate embodiment described in FIGS. 10, 10A, 10B and 10C. Thus the scope of the invention should be determined by the appended claims and their legal equivalents, and not by the examples given.

I claim:

1. A method of separating and removing the solids from a liquid-solid slurry stream comprising the steps of:
    providing a filter retention structure comprising:
        an elongated, vertically extending bag retainer comprising a skeletal tower framework having a plurality of uprights and rectangular frames that run horizontally around said uprights and are spaced vertically down said retainer and are configured and arranged to provide sufficient strength to withstand pressure generated by any liquid-solid slurry within said structure, while facilitating gravity drainage of said liquid;
        an permeable filter bag installed within and suspended from said bag retainer using a plurality of hooks or pins located at an upper portion of said bag retainer;
        means for pumping solids laden slurry into the retention structure; and
        means for discharging dewatered solids from the bottom of said elongated, vertically extending bag retainer wherein said filter retention structure is positioned above a support structure allowing discharged solids to gravity flow into a transport vessel or hopper and wherein said means for discharging dewatered solids closes around an open end of said permeable filter bag preventing leakage of solids during a filling process;

pumping said liquid-solid slurry stream into said filter retention structure using said means for pumping solids laden slurry into the retention structure;

allowing said liquid to drain through said permeable filter bag, leaving substantially deliquified solids within said filter retention structure; and opening said means for discharging to allow said substantially deliquified solids within said filter retention structure to exit from the bottom of said structure by gravity.

2. The method of claim 1, further including the step of adding a flocculent or coagulant to said liquid-solid slurry.

* * * * *